United States Patent [19]

Franklin, Jr. et al.

[11] 4,136,486

[45] Jan. 30, 1979

[54] METHOD AND COMPOSITIONS FOR INOCULATING *LEGUMINOSAE* WITH BACTERIA

[75] Inventors: Alfred A. Franklin, Jr., Sarasota, Fla.; Ian C. McLeod, Okemos, Mich.

[73] Assignee: Microlife Technics, Inc., Sarasota, Fla.

[21] Appl. No.: 867,312

[22] Filed: Jan. 6, 1978

[51] Int. Cl.$^2$ .................................................. A01C 1/06
[52] U.S. Cl. ........................................ 47/58; 47/57.6; 71/7; 47/DIG. 9
[58] Field of Search ................ 71/7; 47/57.6, DIG. 9, 47/58, 1; 111/1, 7

[56] References Cited

U.S. PATENT DOCUMENTS

| | | | |
|---|---|---|---|
| 2,954,643 | 10/1960 | Porter et al. | 47/58 |
| 2,995,867 | 8/1961 | Burton | 47/57.6 |
| 3,054,219 | 9/1962 | Porter et al. | 47/57.6 |
| 3,499,748 | 3/1970 | Fraser | 71/7 |
| 3,976,017 | 8/1976 | Leffler | 111/1 |

*Primary Examiner*—Robert E. Bagwill
*Attorney, Agent, or Firm*—Ian C. McLeod

[57] ABSTRACT

A method is described which uses a composition including a small non-toxic amount (less then about 0.001 part per part of the composition) of a water soluble adhesive agent, particularly an alkali metal salt of carboxymethyl cellulose, with water and with nitrogen fixing bacteria for applying the bacteria on the surfaces of seeds of the plant family *leguminosae* or on particles surrounding the seeds including soil particles or combinations thereof. The nitrogen fixing bacteria are of a symbiotic species and are selectively isolated from effectively nodulated plants of the variety to be inoculated so that they are efficient in inducing effective root nodulation in the plants. Novel compositions are described which include the bacteria mixed with water and the adhesive agent and which are prepared by a manufacturer, frozen for shipment, and then thawed and substantially diluted with water by the farmer or other user for application.

17 Claims, No Drawings

METHOD AND COMPOSITIONS FOR INOCULATING *LEGUMINOSAE* WITH BACTERIA

SUMMARY OF INVENTION

The present invention relates to a novel method and to compositions for inoculating *leguminosae* seeds or particles surrounding the seeds or combinations thereof with selected nitrogen (dinitrogen) fixing bacteria. In particular, the present invention relates to such method and compositions which incorporate small amounts of a non-toxic adhesive agent, such as an alkali metal salt of carboxymethyl cellulose, with water for application of the bacteria.

PRIOR ART

The prior art has used relatively substantial amounts of water soluble adhesive agents, particularly water soluble celluloses and gums, to form viscous aqueous solutions to adhere nitrogen fixing bacteria to the seeds of leguminous plants and/or particles surrounding such seeds. The problem is that the adhesive agents are bacteriostatic under these application conditions and contribute to the killing of the bacteria over a period of time.

There are a number of commercial liquid adhesive agent containing preparations and they are referred to as "syrups" or "sirups" as in USDA Bulletin No. 2003. The term "sirup" describes relatively high viscosity solutions which are formulated for ease of mixing and dilution with water and certainty of seed coating. The preferred adhesive agents are "gel" forming, which retain or bind substantial amounts of water to prevent dehydration of the bacteria after coating. The amount of adhesive agent per seed is high and the coatings tend to be thick due to the viscosity of the solutions.

U.S. Pat. No. 2,995,867 to Burton shows a dispersing agent (particularly calcium silicate) used to introduce the methyl cellulose as the adhesive agent into cold water with the bacteria. Additional sugar is included as a nutrient for the bacteria, which also tends to be bacteriostatic. Methyl cellulose, sucrose and calcium silicate are used in equal proportions at a rate of 1.5 pound per 3 gallons (681 grams to 11.355 liters of water) or about 6.0 percent by weight. This is about 4.0 percent sucrose and methyl cellulose (about equal amounts). The bacteria are provided in a dried peat moss carrier and thus have a greatly reduced viability even before coating. U.S. Pat. No. 2,954,643 to Porter also describes liquid bacterial compositions for seed coating, specifically compositions containing 57 percent sucrose, 2 percent gum arabic and 2 percent gelatin by weight, using air in a fluidized bed method for coating. Sucrose is undesirable in an inoculant because it is an excellent substrate for competing or ontogenetic microorganisms.

It is believed that the most satisfactory means for seed inoculation described by the prior art is the use of bacteria inoculated peat moss particles in an aqueous solution with a relatively large amount (at least 5% up to 40% by weight) of an adhesive agent, such as sodium carboxymethyl cellulose (CMC), at ambient temperatures. This procedure is described in "A Manual For the Practical Study of Root Nodule Bacteria" (1970) by J. M. Vincent. The problem is that at these higher concentration levels, CMC tends to be bacteriostatic to the bacteria on the coated seed. For this reason, U.S. Pat. No. 3,054,219 to Porter et al. indicates that materials destructive to the bacteria should not be included in the liquid medium for seed inoculation and describes a method where the seeds are inoculated with large numbers of bacteria without an adhesive agent. Even so, adhesive agents are very useful for adhering the bacteria to the seed or particles surrounding the seeds so long as they are not used at bacteriostatic levels. U.S. Pat. No. 3,499,748 to Fraser indicates that direct seed inoculation with the bacteria in a liquid is unsatisfactory because of the low survival time (less than 24 hours) of the bacteria. In this method, plaster granules are coated with the bacteria and an adhesive agent in solution (saturated sucrose solution or about 68% sucrose). CMC is used in small amounts as a setting retarder.

U.S. Pat. No. 3,976,017 to Leffler describes a process and apparatus for applying nitrogen fixing bacteria in water at ambient temperatures in a furrow on the soil particles surrounding the seeds. There are other processes of this type such as described in Experimental Agriculture Volume 4, pages 219 to 226 (1968) by J. Schiffman and Y. Alper. It is important in these methods that the bacteria adhere to the soil particles surrounding the seeds after they are applied and are viable before application. An adhesive agent is desirable to provide adherence.

OBJECTS

It is therefore an object of the present invention to provide a method which utilizes a small non-toxic or non-bacteriostatic amount of an adhesive agent or "sticker" to apply and adhere selected nitrogen fixing bacteria to seeds, particles surrounding the seeds or a combination thereof. It is further an object of the present invention to provide a method which increases the duration of viability of substantial numbers of the bacteria after they are applied. Further still, it is an object of the present invention to provide storable frozen concentrated bacterial compositions which include the needed amount of the adhesive agent when manufactured and require only mixing with water to dilute the composition before application and have a long shelf life even in the presence of relatively large amounts of the adhesive agent. These and other objects will become increasingly apparent by reference to the following description.

GENERAL DESCRIPTION

The invention also relates to a bacterial composition for seed coating which comprises in admixture: nitrogen fixing bacteria useful for inducing root nodulation by applying the bacteria to seeds of the plant family *leguminosae*, particles surrounding the seeds including soil particles or a combination thereof, in a concentration of at least about $10^3$ bacteria per ml; between 0.0001 and 0.1 parts per part by weight of the bacterial composition (0.01 to 10 percent) of a non-toxic water soluble adhesive agent, such as a carboxymethyl cellulose alkali metal salt; and water in an amount of at least about 0.5 part per part of the composition by weight (50 percent), wherein the composition can adhere the bacteria on the surface of a *leguminosae* seed, particles surrounding the seed or a combination thereof when diluted in water to provide the adhesive agent in an amount less than about 0.001 part adhesive agent per part of the resulting composition by weight and wherein the composition is frozen and is storable for extended periods of time. Preferably the bacterial composition is frozen at below $-20°$ C.

The present invention relates to the method of inoculating seeds of the plant family *leguminosae,* particles surrounding the seeds including soil particles or a combination thereof with nitrogen fixing bacteria in order to induce root nodulation which comprises: providing nitrogen fixing bacteria which are selected to be infective of the particular variety of plant of the seeds to be inoculated in admixture in a composition with water in an amount of at least about 0.99 part per part of the composition by weight and with a non-toxic, water soluble adhesive agent, such as an alkali metal carboxymethyl cellulose salt, at a temperature which maintains the viability of the bacteria (preferably about 1° C. to 35° 1 C.) to produce a composition containing between about $10^2$ and $10^8$ bacteria per ml, wherein the adhesive agent is present in an amount less than about 0.001 part per part of the composition by weight (1%) which is sufficient to adhere the bacteria to the seeds, the particles or a combination thereof; and applying the composition to the seeds, the particles or a combination thereof, so that each contain at least about $10^3$ bacteria, wherein after application a temperature is maintained prior to planting (preferably about 4° C. to 28° C.) which provides viability of the bacteria for a period of at least 24 hours. The temperature of the coated seeds and/or particles surrounding the bacteria must not exceed 40° C. prior to planting of the seeds in order to maintain viability of the bacteria.

As previously discussed, plants of the family *leguminosae* can have a symbiotic relationship with nitrogen fixing bacteria of the genus Rhizobium. These bacteria form nodules on the roots of the plant in order to fix nitrogen from the atmosphere which is then utilized by the plant for growth. Nitrogen fixing bacteria are naturally present in the soil in the field at low levels and can cause nodulation but it may not be effective nodulation. Effective (nodulation) means that the bacteria are effective, i.e., nodulation that results in active nitrogen fixation. Infective (nodulation) means that the bacteria are infective, i.e., the inoculated bacteria are capable of "infecting" the plant and forming nodules, these nodules may or may not be effective. Thus, the prior art has generally adopted the practice of providing high numbers of bacteria in association with the seeds when they are planted. They can be provided in association with the seeds before or after planting. It has been found that the bacteria in prior art compositions have limited viability because of the method of preparation, storage and/or application. Specific bacteria which are useful are *Rhizobium japonicum, R. leguminosarum, R. phaseoli, R. trifolii, R. meliloti, R. lupini,* or Rhizobium sp. of the cowpea group.

An important part of the method of the present invention is the selection of the proper strain of nodule inducing nitrogen fixing bacteria for a particular variety of plant. If a careful selection procedure is not used, the very low levels of an adhesive agent admixed with Rhizobium as set forth herein will not function to effectively inoculate large numbers of seeds from diverse sources. Essentially the procedure includes matching a particular bacterial strain with a particular variety of seed(s) to make sure that the bacteria induce effective root nodulation in the plant at a low level of bacteria per seed even in the presence of the adhesive agent. High infectivity means that even if large numbers of the bacteria should die on the seed, those remaining alive are infective and capable of inducing effective nodulation. An excellent test of effectivity is to measure the amount of acetylene reduced to ethylene by the plant which indicates the rate of nitrogen fixation by the bacteria in the root nodules. This procedure is described in Plant Physiol. 43: 1185-1207 by Hardy et al. (1968) and in U.S. Pat. Nos. 3,591,458 and 3,904,481.

Unexpectedly it has been found that very small amounts of an adhesive agent can be used in aqueous solutions if the nitrogen fixing bacteria are carefully selected for providing maximum root nodulation and the temperatures are maintained to provide viability. Also, unexpectedly when substantial amounts of the adhesive agents are used in the frozen bacterial compositions according to the present invention, they remain undamaged and storable over an extended period of time up to about 1 year.

The frozen bacterial compositions of the present invention can be stored for prolonged periods prior to application, and can then be thawed and diluted to apply the bacteria to a particulate substrate such as soil, peat moss or particles of a solid carrier which is to be mixed with the seed; or to the seed. After application to a substrate, most of the bacteria do not survive storage for extended periods beyond 14 days even at reduced temperatures. Thus for maximum viability, it is preferred to thaw, dilute the frozen bacterial compositions with water and apply them by the method of the present invention with planting of the seeds within a short period of time (i.e., no more than about 48 hours at 28° C.). The bacteria in the diluted aqueous compositions or after application to seeds or the like are viable for several days if maintained at a temperature of 4° C. to 28° C.

It has been found that a small amount of a water soluble adhesive agent, such as an alkali metal salt of carboxymethyl cellulose, in an aqueous solution with the bacteria can be used to effectively apply the bacteria to seeds, particles surrounding the seeds or a combination thereof. The adhesive agents are present in a concentration of less than about 0.001 part per part by weight of the solution which is applied. The aqueous bacterial solution contains between about $10^2$ to $10^8$ bacteria per ml and preferably the seeds or particles are each coated with between about $10^3$ to $10^7$ bacteria.

Generally the water soluble cellulose ethers are preferred as adhesive agents and have a degree of substitution (D.S.) between about 0.4 to 1.4 in order to be water soluble with a D.S. of 0.65 to 0.85 being preferred. Preferably they have a high molecular weight (about 500,000 to 1,000,000 and a degree of polymerization of above about 3000 for CMC). The preferred CMC solutions have a viscosity at a 1 percent by weight level of between 2500 to 4500 centipoises. One preferred CMC is 7H4X$_{t.m.}$ sold by Hercules, Inc. The preferred CMC's are sodium salts and the solutions preferably contain an amount of CMC less than about 0.0005 part per part of the composition by weight (0.05 percent) for application to the seeds. Other cellulose ethers as described in Kirk-Othmer Vol 4 pages 643 to 646 (1964) can be used at comparable levels, if the water binding, adhesive and solubility properties are similar to CMC and if they are non-toxic. Many cellulose ethers bind water as indicated in the literature which may in part account for the increased viscosity of aqueous solutions in relatively low concentrations.

The bacterial composition is preferably obtained from a manufacturer in highly concentrated frozen form for thawing, mixing with water and then applying to the seeds, carrier particles and/or soil particles and the like. The frozen compositions contain between about 0.0001 and 0.01 part per part of the composition of the adhesive agent and at least about 0.5 part of water per part of the composition. The compositions contain at least about $10^3$ cells per ml and can contain up to about $10^{12}$ cells per ml. Preferably there are about $10^8$ to $10^{12}$ cells per ml. The compositions usually contain the growth or nutrient medium for the bacteria in order to retain viability. Additional nutrient medium can be added prior to freezing. The concentrates are preferably frozen to less than about $-20°$ C. for shipment to the user and can contain a known freezing stabilizing agent for the bacteria such as glycerol or monosodium glutamate.

Seeds can be coated using a variety of known types of equipment including sprayers and the like which are described in the prior art. A satisfactory unit is one where the solution is metered in doses into the inlet of an auger or helical screw mounted in a tube along with the seeds. Preferably the tube is mounted at an upwardly inclined angle to the horizontal from the point of seed entry. Mixing is due to the movement of the seeds by the auger up the tube so as to coat the seeds. The unit is manufactured by Gustafsen, Inc. of Dallas, Tex. Soil, peat moss and the like can be treated using a variety of conventional equipment including sprayers and the like.

SPECIFIC DESCRIPTION

The first step in the bacterial selection procedure is to obtain isolates from nodules, culture collections and the like. To isolate a bacterium from a nodule, the nodule must be surface sterilized by immersion in acidic-mercuric chloride for five (5) minutes and 95% ethyl alcohol for one (1) minute followed by several rinses with sterile, distilled water. The nodule is then crushed with sterile forceps and streaked across a YEM (yeast-extract, mannitol) agar plate containing cycloheximide (to prevent fungus growth). This plate is then incubated for 10 days at 25° C. Typical Rhizobial colonies (clear to white, mucoid and are easily recognizable) are picked and inoculated into YEM broth.

When the inoculated YEM broth becomes turbid after approximately 10 days incubation at 25° C., a host plant seed is inoculated with the culture. To inoculate, the seeds are surface sterilized as described for nodules and placed in a growth jar (containing sand covering a layer of vermiculite). One milliliter (1 ml) of the broth culture is placed on each seed. For large seed legumes two seeds per jar are used and for small seed legumes up to 10 per jar are used. The seeds are covered with sterile sand and jars are placed in a growth room. The plants are allowed to grow 21 days. The growth room maintains a temperature of 18.3° C. during the dark cycle and 26.6° C. during the light cycle. The photoperiod is 18 hrs. Relative humidity is maintained at 50%. The plants are grown under Gro-Lux$_{T.M.}$ lamps (GTE-Sylvania) radiating the excess of 3720 lumens.

After the growth period, the roots are examined for the presence of nodules and for nodule color (active nitrogen fixing nodules are pink to red in color). The plants can be tested for acetylene reduction by being placed in a sealed jar and incubated in the presence of 0.1 atm. acetylene for 1 hr. Gas samples are injected into a gas chromatograph to test for ethylene. The amount of ethylene produced per plant per hour is recorded.

The Rhizobium strain is re-isolated from a single nodule (as described above). The re-isolated (single colony pick) strain is streaked onto a YEM agar slant and again incubated at 25° C. for 10 days. One loop of slant culture is inoculated in YEM broth and the slant is refrigerated. After the YEM broth tube has become turbid, the host plant seed is inoculated as described above. If culture again nodulates the host plant, the refrigerated YEM agar slant culture was used in the present invention. In the same manner, cultures are periodically tested for infectivity-effectivity to determine the retained stability of this characteristic during prolonged storage on artificial medium.

The strain selection process is summarized as follows: (1) obtain isolates (from nodules, culture collections, etc.); (2) grow the isolate in broth and inoculate the proper host seed. Allow plant to grow and observe for nodules, nodule color, and test for acetylene reduction; and (3) re-isolate the strain from nodules in YEM and repeat step (2). Generally two (2) or more separately grown bacterial strains which are infective for a particular plant variety were used in the bacterial compositions. The bacteria were preferably individually concentrated by growth in a conventional medium. The cells can be separated from the growth medium by centrifugation and the like.

In the following Examples I to VII, sodium carboxymethyl cellulose (CMC) having a D.S. of 0.65 to 0.85 (CMC7H4)$_{t.m.}$ was used. In Examples II and III, substantial amounts of gum arabic or sucrose were used as adhesive agents for comparison, making sure the bacteria were only in solution with the adhesive agents as short a time as possible and immediately planting the seeds to eliminate bacteriostatic effects. In Examples IV and V, the bacteria were frozen with CMC for storage and shipment. Examples VI and VII are field trials. The percentages in the Examples are by weight.

EXAMPLE I

A coating mix was prepared which was an aqueous solution containing 0.125 percent CMC or 5 grams in 4 liters (4000 grams) of cold water (about 18° C. to 26° C.). A composition of a selected *Rhizobium japonicum* containing about $20 \times 10^9$ bacteria per ml was added to the solution in the amount of 20 ml. Soybean seeds were coated using the previously described auger type Gustafsen$_{t.m.}$ seed coater which applied between about $10^3$ and $10^8$ bacteria per seed. The seeds were then stored at 4° C. and 25° C. for various time intervals before they were planted in a growth jar as described previously. The resultant plants were examined for root nodulation after 21 days as described previously.

It was found that nodulation was achieved when the seeds were planted after three (3) days of storage at the above temperatures. However, when the coated seeds were stored at 35° C. for longer than eight (8) hours, the Rhizobium bacteria were not effective, thus indicating that care must be taken to maintain a reduced temperature.

EXAMPLE II

The procedure of Example I was repeated using 0.25 percent CMC with a 0.05 percent rhodamine red dye which served as a check on complete coating. In addition, a commonly used coating solution of 25 percent sucrose in 4 liters of cold water was prepared. Three different concentrates of selected strains of *Rhizobium japonicum* were used. Each concentrate contained about $5 \times 10^7$ cells per ml.

Seeds were coated as in Example I with the solutions and were immediately planted in growth jars as in Example I. The resultant plants were examined for nodulation after 21 days as described previously. It was found that the seeds coated with the low level of CMC produced plants with the same degree of root nodulation as plants from seeds coated with the much higher (100 times) sucrose solution. The red dye did not effect nodulation. In a short period of time the bacteria in the high sugar solutions would greatly decrease in viable numbers.

EXAMPLE III

In this Example, the CMC was mixed with a selected *Rhizobium japonicum* in an amount by weight of 0.0075 part CMC per part of bacterial composition ($20 \times 10^9$ cells/ml) and frozen to $-20°$ C. The product was stored for a period of 1 week and then thawed, mixed with cold water in a weight ratio of 170 grams per 19 liters of water and used to coat the seeds in the manner of Example I. The solution contained 66 ppm CMC. The seeds were planted in a growth jar and grown for 21 days. The roots were then examined for nodulation. It was found that the CMC functioned as an adhesive without impairing the infectivity/effectivity and did not impair the bacteria during storage.

EXAMPLE IV

In this example, the CMC was mixed with a selected *Rhizobium japonicum* strain in an amount of 0.001 part CMC per part of bacterial concentrate and frozen to $-20°$ C. The product was stored at $-20°$ C. for one (1) year and then was thawed, mixed with water in a weight ratio of 170 gms per 19 liters of cold water and used to coat soybean seeds. The seeds were planted in a growth jar and grown for 21 days. The roots were then examined for nodulation. It was found that the seeds coated with the diluted frozen bacterial composition produced plants with good nodulation even after storage of the frozen composition for one (1) year.

The results of Examples I to IV with CMC were repeated in field trails as shown in Examples V and VI.

EXAMPLE V

Soybean variety: Lee
Plot:
    48 inch row space
    10 foot row length.
Inoculation rate: A frozen concentrate of 170 ml of Rhizobium concentrate ($20 \times 10^9$ cells/ml) was used. The culture was thawed and added to 4 liters of cold water. Thirty (30) grams of CMC was mixed in the culture water. The resulting solution contained about 0.72 percent CMC. The seeds were coated with the bacterium using the previously described Gustafsen seed coater and planted within 1 hr. of coating. Included in the test was a commercial peat moss containing bacteria planted with the seeds as well as uncoated control seeds. After 21 days, approximately 50 plants per plot were pulled. Soil was carefully rinsed from the roots and the roots were visually examined for nodules. There was no significant nodulation in any of the plots except with those plots containing the CMC and Rhizobium coated seeds. The nodulation on the roots was extensive with large and very red nodules, many of which were on the tap root.

EXAMPLE VI

Soybean variety: Lee
Plot: 10 foot Rows double spaced
Inoculation rate: A frozen concentrate of 170 ml Rhizobium concentrate ($20 \times 10^9$ cells/ml) which contained 15 grams of CMC (8.8% of total weight) mixed with 15 ml of glycerol as a freezing stabilizing agent mixed with the Rhizobium was thawed and added to 5 gallons (18.9 liters) of cold water and applied to seeds using the Gustafsen seed coater previously described. The final coating solution contained about 0.079 percent CMC. The seeds were planted within 1 hr of coating. After 21 days, the plants were pulled and examined for nodulation as in Example V. There were nodules on the roots of the plants from treated seeds while the uninoculated controls contained no nodules. The control seeds were not nodulated.

The coatings of the present invention on seeds or carrier particles are very thin, i.e., usually about 2 mils thick or less because of the small amounts of the adhesive agent. The coatings contain significant amounts of nutrient medium and water which help to maintain the viability of the bacteria.

We claim:

1. The method of inoculating seeds of the plant family *leguminosae*, particles surrounding the seeds including soil particles or a combination thereof with nitrogen fixing bacteria in order to induce root nodulation which comprises:
   (a) providing nitrogen fixing bacteria which are selected to be infective of the particular variety of plant of the seeds to be inoculated as a composition in admixture with water in an amount of at least about 0.99 part water per part of the mixture by weight and with a non-toxic water soluble adhesive agent at a temperature which maintains the viability of the bacteria to produce a mixture containing between about $10^2$ and $10^8$ bacteria per ml, wherein the adhesive agent is present in an amount less than about 0.1 part per part of the mixture by weight which is sufficient to adhere the bacteria to the seeds or the particles or a combination thereof; and
   (b) applying the composition to the seeds, the particles or a combination thereof so that each contain at least about $10^3$ bacteria, wherein after application a temperature is maintained prior to planting which provides viability of the bacteria for a period of at least 24 hours.

2. The method of claim 1 wherein the application is to seeds, particles with the seeds and combinations thereof prior to planting and wherein the temperature after application does not exceed about 40° C. prior to planting and the planting of the seeds is in at least 14 days.

3. The method of claim 1 wherein the composition including the adhesive agent and the bacteria is frozen for shipment and thawed for mixing with water and then applying to the seeds, to the particles surrounding the seeds or a combination thereof.

4. The method of claim 3 wherein the frozen composition contains a freezing stabilizing agent.

5. The method of claim 3 wherein the freezing stabilizing agent is glycerol or monosodium glutamate.

6. The method of claim 1 wherein the adhesive agent is sodium carboxymethyl cellulose.

7. The method of claim 1 wherein the bacteria are in admixture with medium used to grow the bacteria to a level of about $10^9$ bacterial cells per ml for mixing with water and then application.

8. The method of claim 1 wherein the bacteria are of the genus Rhizobium.

9. The method of claim 1 wherein the adhesive agent is in a frozen composition with the bacteria in an amount by weight of between about 0.0001 to 0.1 part adhesive agent per part of the composition for shipment to a user and is thawed and mixed with the water for application by the user.

10. The bacterial composition which comprises in admixture:
(a) nitrogen fixing bacteria useful for inducing root nodulation by applying the bacteria to seeds of the plant family *leguminosae*, particles surrounding the seed including soil particles or a combination thereof in a concentration of at least about $10^3$ bacteria per ml;
(b) between 0.0001 and 0.1 part per part by weight of the composition of a non-toxic, water soluble adhesive agent; and,
(c) water in an amount of at least about 0.5 part per part of the composition by weight, wherein the composition can adhere the bacteria on the surface of a *leguminosae* seed, particles surrounding the seed or a combination thereof when diluted in water to provide the adhesive agent in an amount less than about 0.001 part adhesive agent per part of the resulting composition by weight and wherein the composition is frozen and is storable for extended periods of time.

11. The composition of claim 10 which contains at least about $10^8$ bacteria per ml in admixture with a growth medium for the bacteria.

12. The composition of claim 10 which contains at least about $10^8$ bacteria per ml and is frozen at $-20°$ C.

13. The composition of claim 10 wherein the adhesive agent is sodium carboxymethyl cellulose.

14. The composition of claim 10 wherein the bacteria are of the genus Rhizobium.

15. The composition of claim 14 wherein the bacteria are *Rhizobium japonicum, R leguminosarum, R. phaseoli, R. trifolii, R. meliloti, R. lupini,* or *Rhizobium* sp. of the cowpea group.

16. The composition of claim 10 which includes a freezing stabilizing agent.

17. The composition of claim 16 wherein the freezing stabilizing agent is glycerol or monosodium glutamate.

* * * * *